United States Patent
Kahn et al.

(10) Patent No.: US 8,140,115 B1
(45) Date of Patent: Mar. 20, 2012

(54) APPLICATION INTERFACE

(75) Inventors: Philippe Kahn, Aptos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 730 days.

(21) Appl. No.: 12/176,313

(22) Filed: Jul. 18, 2008

(51) Int. Cl.
*H04M 1/00* (2006.01)

(52) U.S. Cl. ............... 455/556.1; 455/414.1; 455/414.2; 455/168.1; 345/158

(58) Field of Classification Search ............... 455/556.1, 455/414.1, 414.2, 168.1, 418, 3.06, 127.4; 345/158; 379/330, 88.12, 88.13
See application file for complete search history.

(56) References Cited

U.S. PATENT DOCUMENTS

| | | | | |
|---|---|---|---|---|
| 5,161,226 A * | 11/1992 | Wainer | | 710/264 |
| 5,375,161 A * | 12/1994 | Fuller et al. | | 455/417 |
| 5,428,772 A * | 6/1995 | Merz | | 1/1 |
| 5,610,970 A * | 3/1997 | Fuller et al. | | 455/417 |
| 5,673,299 A * | 9/1997 | Fuller et al. | | 379/210.03 |
| 6,013,007 A | 1/2000 | Root et al. | | |
| 6,122,360 A * | 9/2000 | Neyman et al. | | 379/220.01 |
| 6,822,635 B2 * | 11/2004 | Shahoian et al. | | 345/156 |
| 7,010,332 B1 | 3/2006 | Irvin et al. | | |
| 7,031,728 B2 * | 4/2006 | Beyer, Jr. | | 455/456.3 |
| 7,190,263 B2 * | 3/2007 | McKay et al. | | 340/539.1 |
| 7,489,297 B2 * | 2/2009 | Hohmann et al. | | 345/158 |
| 7,499,725 B2 * | 3/2009 | Ootuka | | 455/556.1 |
| 7,689,232 B1 * | 3/2010 | Beyer, Jr. | | 455/457 |
| 2005/0232404 A1 | 10/2005 | Gaskill | | |
| 2007/0125852 A1 | 6/2007 | Rosenberg | | |
| 2007/0190979 A1 * | 8/2007 | Hatano | | 455/414.1 |
| 2008/0165022 A1 | 7/2008 | Herz et al. | | |
| 2009/0048001 A1 * | 2/2009 | Mihara et al. | | 455/566 |
| 2009/0088204 A1 * | 4/2009 | Culbert et al. | | 455/556.1 |
| 2009/0124196 A1 * | 5/2009 | Moon et al. | | 455/3.06 |
| 2009/0191850 A1 * | 7/2009 | Cardwell et al. | | 455/412.2 |
| 2009/0262074 A1 * | 10/2009 | Nasiri et al. | | 345/158 |
| 2010/0067434 A1 * | 3/2010 | Siu et al. | | 370/328 |
| 2010/0214216 A1 * | 8/2010 | Nasiri et al. | | 345/158 |

* cited by examiner

*Primary Examiner* — Minh D Dao

(74) *Attorney, Agent, or Firm* — Blakely, Sokoloff, Taylor & Zafman LLP; Judith A. Szepesi

(57) ABSTRACT

A method and apparatus for detecting a shake by a user to invoke an invoked application, identifying whether there is a conflicting application. When a conflicting application is detected, storing state information for the conflicting application and halting the conflicting application. The method further comprising starting the invoked application, and upon detecting an end of use of the invoked application, restoring the conflicting application to the stored state.

20 Claims, 3 Drawing Sheets

APPLICATION INTERFACE

FIELD OF THE INVENTION

The present invention relates to a user interface, and more particularly to an improved method of invoking an application.

BACKGROUND

There are an increasing number of multi-purpose handheld devices. These devices include mobile telephones which also provide features such as music players, calendar managers, game applications etc. They also include personal digital assistants (PDAs) which provide calendar and contact applications, among other features.

Generally speaking, users navigate from an application to another using multiple menus in combination with hardware or software buttons.

SUMMARY OF THE INVENTION

A method comprising detecting a shake by a user to invoke an invoked application, and identifying whether there is a conflicting application. When a conflicting application is detected, the method further includes storing state information for the conflicting application and terminating the conflicting application. The method then includes starting the invoked application. In one embodiment, the method further includes upon detecting an end of use of the invoked application, restoring the conflicting application to the stored state.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a method of using an accelerometer or other motion detection mechanism to simplify navigation between applications. For example, in a multi-function mobile telephone, it often takes multiple navigational steps to get from a current application to the phone application. Furthermore, the user sometimes needs to close applications in order to provide enough RAM (random access memory) to run the new application.

The present application utilizes an accelerometer built into the device to provide speedier access to an application. For example, instead of navigating away from a current application, closing conflicting applications, and opening the dial pad, the user may shake the handheld device in a pre-arranged pattern to invoke the application and simultaneously close down any competing applications. Furthermore, this feature ensures, in one embodiment, that after the application is closed, the previously competing application can be re-started automatically. This means that if the user interrupts, for example, a music program in order to make a telephone call, at the termination of the call, the music program is automatically restarted. In one embodiment, the user may be returned to the screen that was active prior to the invocation of the interrupting application.

In one embodiment, if the applications do not conflict, but the new application has a high bandwidth requirement, in one embodiment the system may throttle the bandwidth available to other applications. In one embodiment, the throttling may simply disconnect the other applications from the network. In one embodiment, when possible, the system saves state so the application can be fully restored when the invoked application is terminated.

Figure 1:
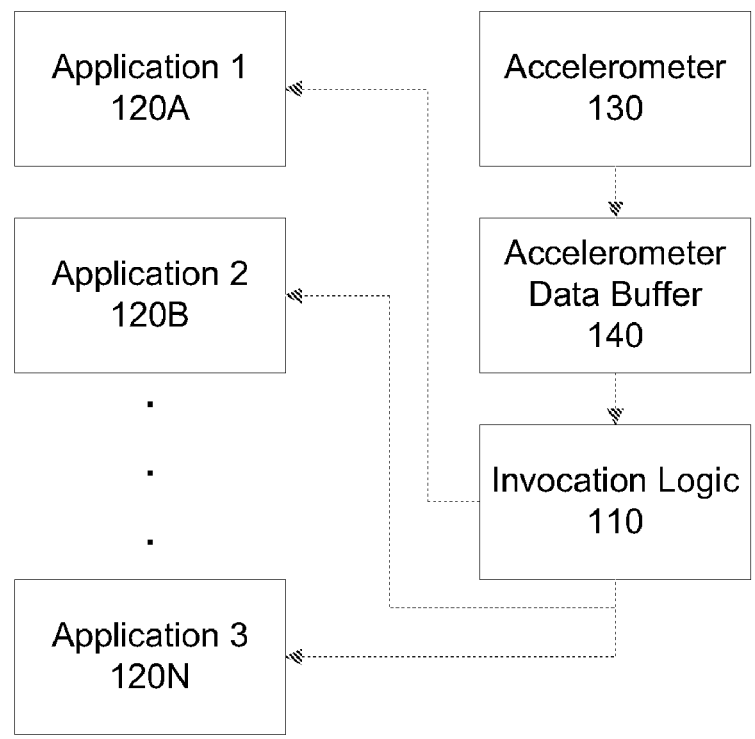
FIG. 1 is a diagram of one embodiment of a handheld device which may include the feature.

FIG. 1 is a diagram of one embodiment of a handheld device which may include the feature. The device includes at least two applications 120A-N. The system further includes an accelerometer 130, and an accelerometer data buffer 140, which collects accelerometer data.

Figure 2:
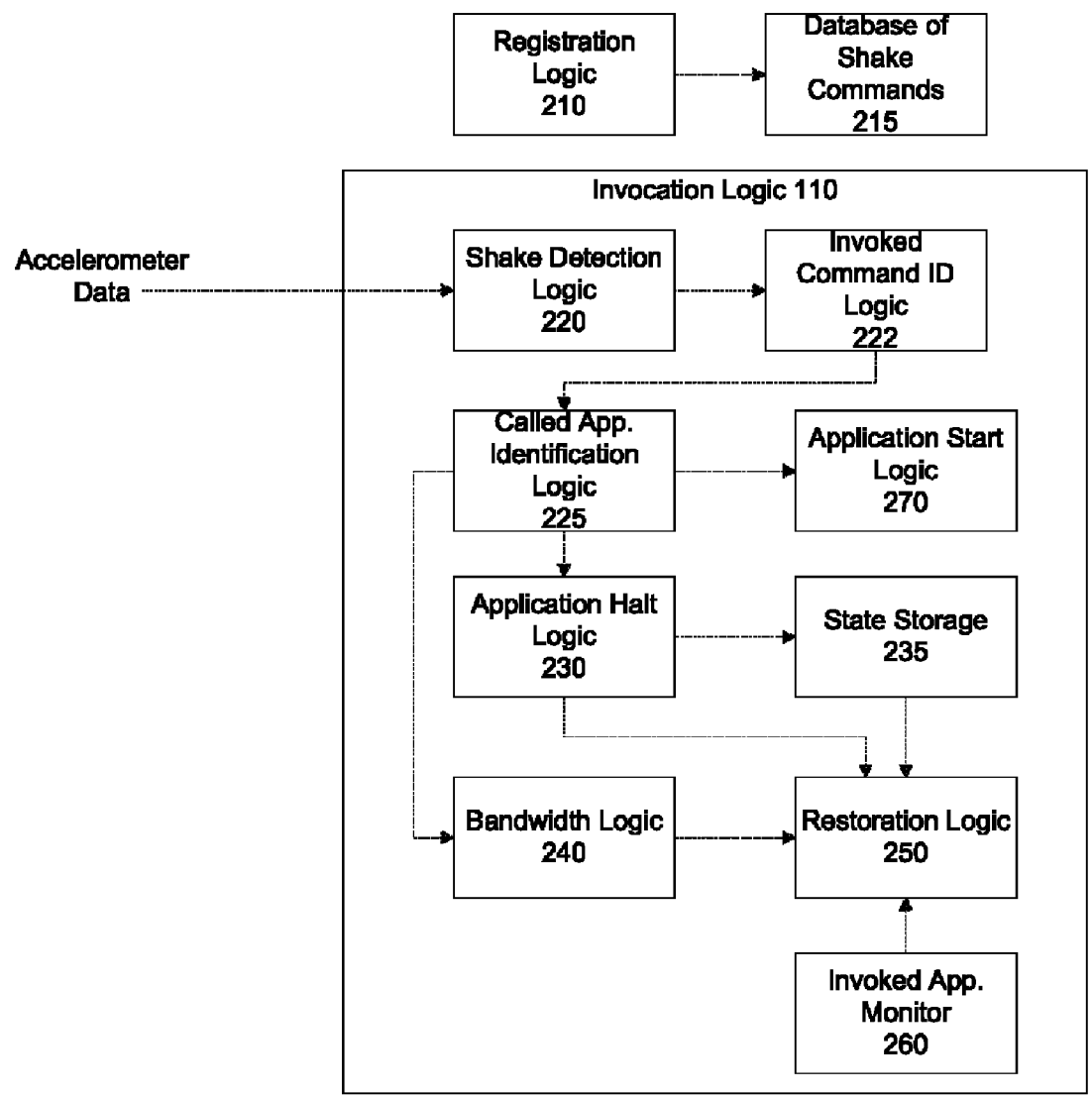
FIG. 2 is a block diagram of one embodiment of the user interface application.

Invocation logic 110 detects the pre-determined shakes, taps, or other motions of the device. These motions are used to trigger various actions. In one embodiment, the system includes an initial set of invoking motions, which may in one embodiment include:

two shakes to go to a dial pad
two shakes to pick up the telephone when it is ringing
three shakes to go to an address book
tap to navigate down a menu FIG. 2 is a block diagram of one embodiment of the user interface application. The accelerometer data, in one embodiment, the buffered data, is input to the invocation logic 110.

In one embodiment, the various motions to command relationships are registered in the database of commands 215. In one embodiment, the system comes with a list of command pre-registered. In one embodiment, the user may add additional commands to the database 215. The commands may include invoking/starting an application, navigation within an application, terminating an application.

Shake detection logic 220 receives the accelerometer data and attempts to identify a command associated with the data. In one embodiment, the command may be to open an application, turn on a device, turn off a device, navigate a menu, or any other command applicable to a mobile device. In one embodiment, if the system includes Invoked command ID logic 222 determines which command, if any, is being invoked. In one embodiment, if various sets of shakes may invoke separate commands (i.e. two shakes invoking a first command, while three shakes invokes a second command) the logic 222 determines the termination of the sequence of motions prior to identifying the command being invoked. Thus, for example, upon detecting a first shake, the command ID logic 222 determines if there is further motion indicating that a 2nd shake is about to occur. Therefore, matching is performed when that 2nd (or 3rd, or 4th) shake or motion is successfully identified, and the motion terminates.

Once the invoked command is identified, the invoked application is identified by the called application identification logic (CAIL) 225. The application may be a user interface application, such as a dial pad for dialing a telephone, contact list, answering a telephone, or any other application.

Application Halt logic 230 utilizing the identified application to determine which, if any, other running applications may conflict with the newly invoked application. For example, a phone application may conflict with a music player because the user cannot simultaneously listen to music and a telephone conversation. Similarly, a game may conflict with any other application since the user cannot pay attention to both the game and the newly invoked application. In one embodiment, the Halt logic 230 determines if the application needs to be terminated or suspended/paused. Applications that actually interfere with the ability to execute the invoked program are terminated. Applications that do not interfere with the ability to execute the program, but cannot be simultaneously used by the user, are paused in one embodiment. In one embodiment, for applications that cannot maintain their state while paused, and for applications which are terminated, the application halt logic 230 stores the state in state storage 235. In one embodiment, sufficient state data is stored to enable the re-starting of the application and if possible returning to the same state as prior to the termination/halt.

In one embodiment, if the application is not a problem, but it uses bandwidth, and the newly invoked application also requires bandwidth availability, bandwidth logic 240 throttles the bandwidth available to the other applications. For example, if the user is downloading something off the Web, while invoking a telephone application, the download speed may be throttled to ensure that adequate bandwidth is available for the phone application. In one embodiment, throttling means reducing the available bandwidth to zero.

The application is then started by application start logic 270.

Invoked application monitor 260 monitors the use of the application. When the application is no longer used, for example when the user hangs up the telephone, invoked application monitor notifies the restoration logic 250. Restoration logic 250 restores the previously halted/terminated applications, and the bandwidth availability. Thus, in one embodiment, restoration logic 250 returns the device to its state prior to the invocation of the application.

Figure 3:
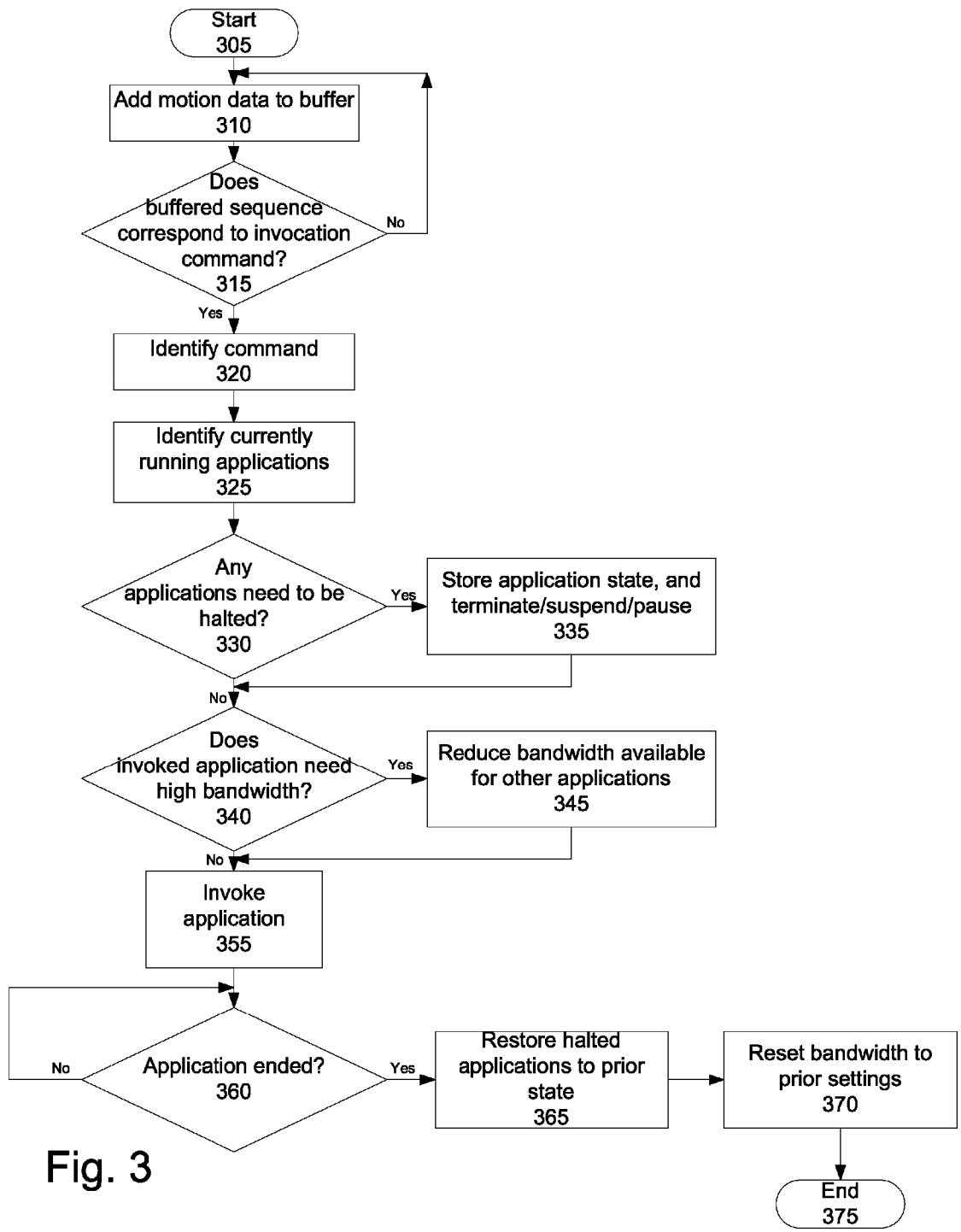
FIG. 3 is a flowchart of one embodiment of the user interface application.

FIG. 3 is a flowchart of one embodiment of the user interface application. The process starts at block 305, when motion is detected. In one embodiment, only motion which is relevant to invocation logic is passed to the buffer for the invocation system. In one embodiment, a virtual accelerometer such as the one described in co-owned patent application Ser. No. 12/685,648, now issued as U.S. Pat. No. 7,970,586, only provides data to the system when the data is applicable to the invocation system.

At block 310 the motion data is added to the buffer. In one embodiment, the data added to the buffer is the currently identified motions, rather than raw accelerometer data.

At block 315, the process determines whether an invocation command has been identified. In one embodiment, an invocation command is not identified until the motion is complete. Thus, for example, if the user is mid-movement and two shakes (a command) could be identified, the system waits until the motion stops, so ensure that the user is not attempting to finish a three-shake command. If the command is not recognizable, or the movement has not stopped, the process continues to block 310 to continue buffering accelerometer data.

At block 320, the command is identified.

At block 325, the currently running applications are identified. In one embodiment, the system may separately identify necessary applications (operating system, applications necessary to enable the use of the invoked application, bandwidth using applications, high CPU-using applications, etc. In one embodiment, only those applications known as conflicting are identified. In one embodiment, the user may designate applications as conflicting. In one embodiment, the system automatically identifies applications that utilize resources necessary for the invoked application as conflicting. In one embodiment, the system comes pre-programmed with a list of applications which may be conflicting with an invoked application.

At block 330, the process determines whether any applications should be halted. Halting applications, in one embodiment, includes terminating, pausing, and suspending applications. If so, at block 335, the identified applications are halted. The process then continues to block 340.

At block 340, the process determines whether the invoked application requires high bandwidth. If so, at block 345, the bandwidth available to other applications is reduced. In one embodiment, this is done on a per-application basis. In one embodiment, any active application which uses a lot of bandwidth is disconnected from the network.

At block 335, the application itself is invoked. As noted above, this may include opening a dial pad on a phone, answering a call on a phone, opening a contact list on a phone, opening a calendar item, opening a mapping program with or without GPS (global positioning system) support, etc. In one embodiment, the user may at this point use motion-based navigation to navigate within the application. In one embodiment, the user may, at any time, invoke another application. Thus, for example, the user may first open an address book via invocation, then realize that he doesn't have a number in there, and open the dial pad via invocation.

At block 360, the process determines whether the invoked application is done. In one embodiment, the user may close the application. In one embodiment, the invoked process (making a phone call, answering a phone call) is terminated in other known ways. When the application is ended, in one embodiment at block 365 the halted applications are restored to their prior state. In one embodiment, this may include opening prior applications. At block 370, if appropriate, the bandwidth settings are reset to their prior state. The process then ends. In one embodiment, the restoration may be a nested process, that is, if multiple applications were invoked in a series, the restoration returns to the previously invoked application. In another embodiment, the restoration returns to the original pre-invocation state for the device.

In this way, the system permits a user to simply and quickly invoke an application, regardless of where in the menu structure and available applications the user is currently. Furthermore, the system ensures that other open applications do not conflict with the invoked application, or do not take away sufficient bandwidth to interfere with the invoked application.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   detecting a shake by a user to invoke an invoked application;
   identifying whether there is a conflicting application, and when a conflicting application is detected storing state information for the conflicting application and halting the conflicting application;
   starting the invoked application; and
   upon detecting an end of use of the invoked application, restoring the conflicting application to the stored state.

2. The method of claim 1, wherein the application comprises a telephone application in a multi-use handheld device.

3. The method of claim 1, wherein starting the invoked application comprises displaying a dialing keypad, and the end of the use of the application comprises hanging up a call.

4. The method of claim 1, further comprising:
determining if the invoked application utilizes bandwidth; and
throttling available bandwidth to other applications while the invoked application is active.

5. The method of claim 1, wherein halting the application comprises one of the following: terminating the application, pausing the application, and suspending the application.

6. The method of claim 1, further comprising:
enabling a user to register one or more motions as the shake.

7. The method of claim 1, wherein the invoked application comprises one of the following: answering a telephone call, displaying a dial pad to enable making of a telephone call, displaying a contact list to enable making of a telephone call.

8. A processor including an invocation logic to invoke an application on a handheld device, the invocation logic comprising:
an invoked command identification logic to identify an application invoked by a shake by a user;
an application halt logic to halt a conflicting application which conflicts with the invoked application, the application halt logic to store a state of the conflicting application in a memory;
an application start logic to start the invoked application; and
a restoration logic to restore the conflicting application to a prior state when the invoked application is ended.

9. The invocation logic of claim 8, further comprising:
a bandwidth logic to throttle bandwidth to an application when the invoked application uses high bandwidth.

10. The invocation logic of claim 8, further comprising:
an invoked application monitor to determine when the invoked application use is terminated, and to trigger the restoration logic.

11. The invocation logic of claim 8, wherein the application comprises a telephone application in a multi-use handheld device.

12. The invocation logic of claim 8, wherein starting the invoked application comprises displaying a dialing keypad, and the end of the use of the application comprises hanging up a call.

13. The invocation logic of claim 8, wherein halting the application comprises one of the following: terminating the application, pausing the application, and suspending the application.

14. The invocation logic of claim 8, further comprising:
a gesture registration logic enabling a user to register one or more motions as the shake.

15. The invocation logic of claim 8, wherein the invoked application comprises one of the following: answering a telephone call, displaying a dial pad to enable making of a telephone call, displaying a contact list to enable making of a telephone call.

16. A handheld mobile device comprising:
an accelerometer to detect a shake;
an invoked command identification logic to identify an application invoked by the shake;
an application halt logic to halt a conflicting application which conflicts with the invoked application, the application halt logic to store a state of the conflicting application in a memory;
an application start logic to start the invoked application; and
a restoration logic to restore the conflicting application to a prior state when the invoked application is ended.

17. The handheld mobile device of claim 16, further comprising:
a communication logic to send and receive information using bandwidth;
a bandwidth logic to throttle bandwidth to an application when the invoked application uses high bandwidth.

18. The handheld mobile device of claim 16, further comprising:
an invoked application monitor to determine when the invoked application use is terminated, and to trigger the restoration logic.

19. The handheld mobile device of claim 16, wherein halting the application comprises one of the following: terminating the application, pausing the application, and suspending the application.

20. The handheld mobile device of claim 16, further comprising:
a gesture registration logic enabling a user to register one or more motions to invoke one or more applications.

* * * * *